(12) United States Patent
Baxter

(10) Patent No.: US 6,425,707 B1
(45) Date of Patent: Jul. 30, 2002

(54) FLOOD PROTECTION DEVICE FOR CLOSING OPENING IN WALL AGAINST FLOODWATER

(76) Inventor: Malcolm Brian Baxter, Tannery House, Wigmore, Hertfordshire, HR6, 9UJ (GB)

(*) Notice: Subject to any disclaimer, the term of this patent is extended or adjusted under 35 U.S.C. 154(b) by 0 days.

(21) Appl. No.: 09/463,954

(22) PCT Filed: Aug. 6, 1998

(86) PCT No.: PCT/GB98/02358

§ 371 (c)(1),
(2), (4) Date: Apr. 10, 2000

(87) PCT Pub. No.: WO99/07973

PCT Pub. Date: Feb. 18, 1999

(30) Foreign Application Priority Data

Aug. 9, 1997 (GB) ............................................. 9716854

(51) Int. Cl.[7] .............................. E02B 7/00; E02B 7/18
(52) U.S. Cl. ........................ 405/87; 405/96; 405/104; 49/477.1
(58) Field of Search ................ 405/87, 2, 91, 405/92, 96, 103, 104, 106, 107, 112, 115; 52/3, 2.3, 169.14, 741.1, 741.3, 741.4, DIG. 12; 49/63, 70, 460, 463, 477.1

(56) References Cited

U.S. PATENT DOCUMENTS

| 3,354,655 A | * | 11/1967 | Armond | 405/96 |
| 3,796,010 A | * | 3/1974 | Carlson | 49/477.1 |
| 4,019,304 A | * | 4/1977 | Timm | 52/746.1 |
| 4,374,834 A | * | 2/1983 | Grace | 405/60 |
| 4,375,929 A | * | 3/1983 | Clark | 405/114 |
| 4,682,443 A | * | 7/1987 | Demo | 49/466 |
| 4,693,042 A | * | 9/1987 | Villarreal | 51/169.14 |
| 5,077,945 A | * | 1/1992 | Koeniger | 52/169.14 |
| 5,154,537 A | * | 10/1992 | DeVries et al. | 405/60 |
| 5,460,462 A | * | 10/1995 | Regan | 405/96 |
| 5,642,534 A | * | 7/1997 | Sanchez et al. | 405/96 X |
| 5,943,832 A | * | 8/1999 | Russell | 52/202 |
| 6,029,405 A | * | 2/2000 | Wood | 52/169.14 X |
| 6,216,399 B1 | * | 4/2001 | Belarbi | 52/169.14 |

FOREIGN PATENT DOCUMENTS

| DE | 29904806 | * | 2/2000 |
| DE | 29919976 | * | 2/2000 |
| EP | 586356 | * | 8/1993 |
| FR | 2737530 | * | 2/1997 |
| GB | 2236344 | * | 4/1991 |
| GB | 2346648 | * | 8/2000 |
| GB | 2353554 | * | 2/2001 |
| GB | 2356661 | * | 5/2001 |
| WO | 9110803 | * | 7/1991 |

* cited by examiner

Primary Examiner—Heather Shackelford
Assistant Examiner—Jong-Suk Le
(74) Attorney, Agent, or Firm—Oblon, Spivak, McClelland, Maier & Neustadt, P.C.

(57) ABSTRACT

An automatically self-erecting barrier which prevents ingress of flood water into a building. A float is provided which when inactive may serve as a doorstep, and which when active rises with the flood water to extend a barrier across a lower part of a doorway into the building. The barrier is guided at its lateral edge, and vertical channels may be fixed to the building on either side of the doorway. The barrier may be sealed to the channels by inflatable sealing elements.

17 Claims, 7 Drawing Sheets

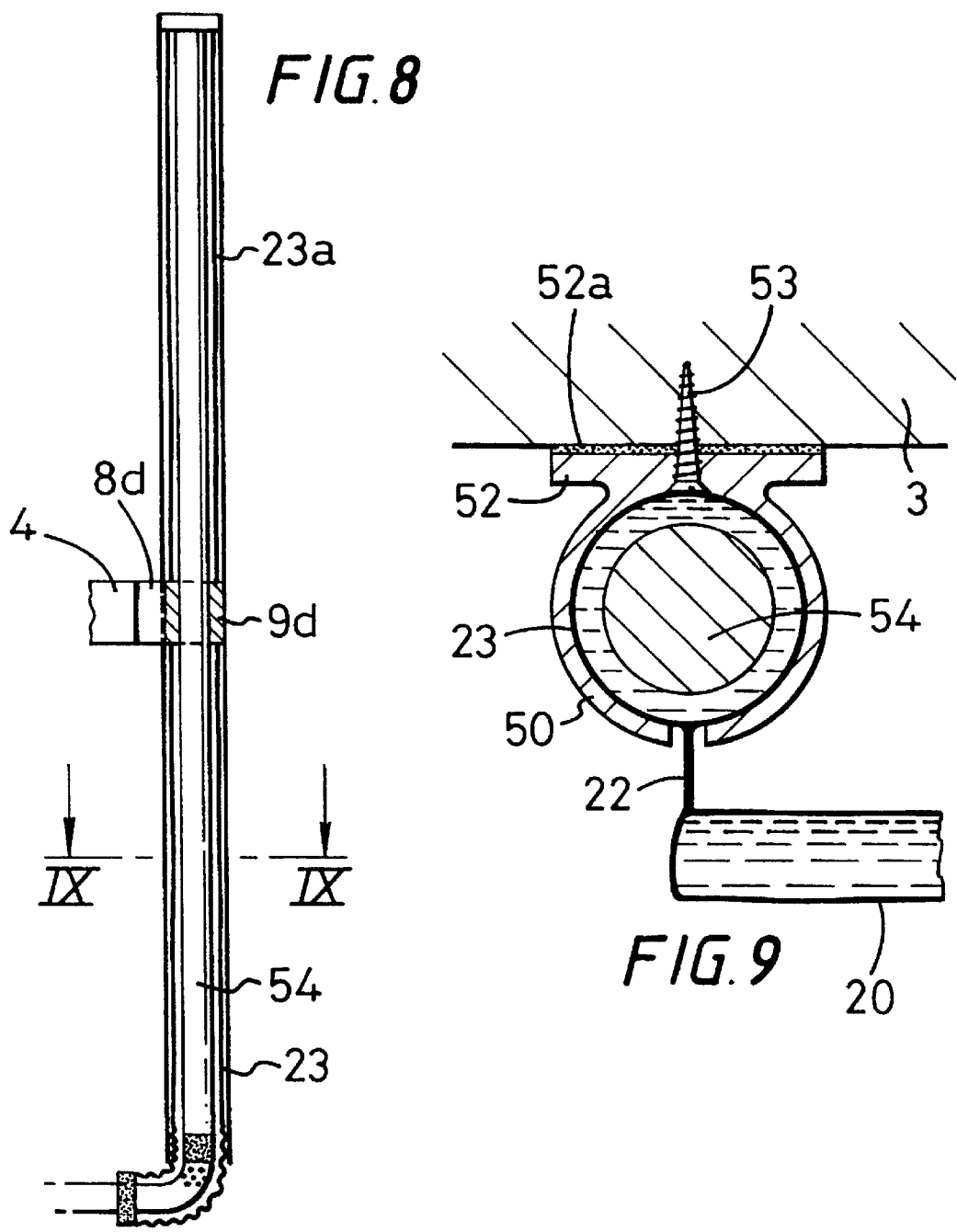

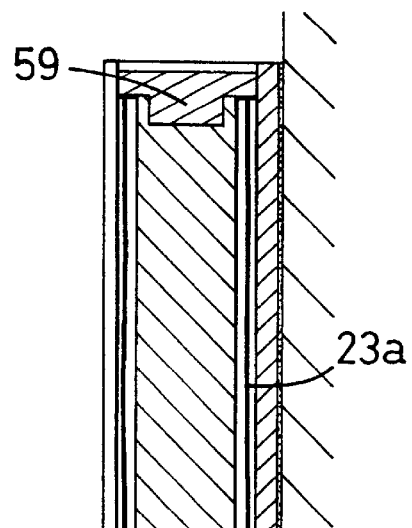
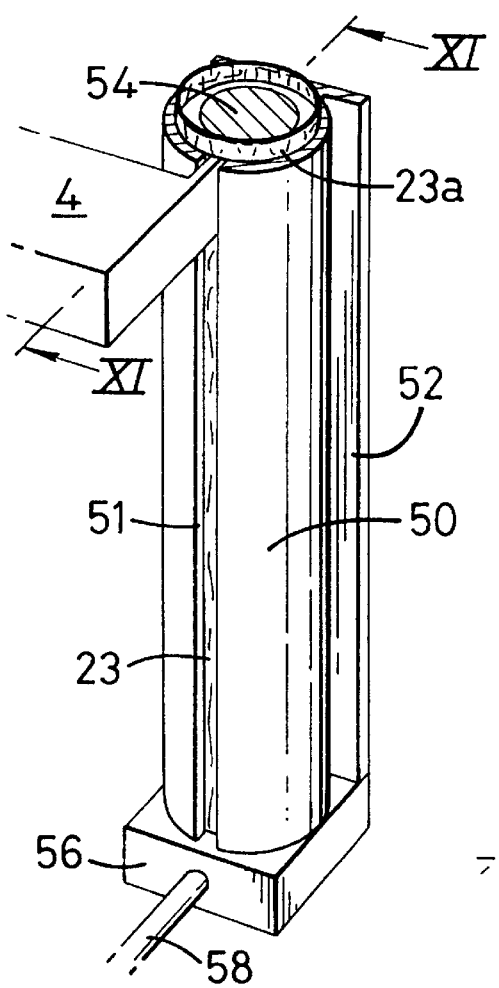
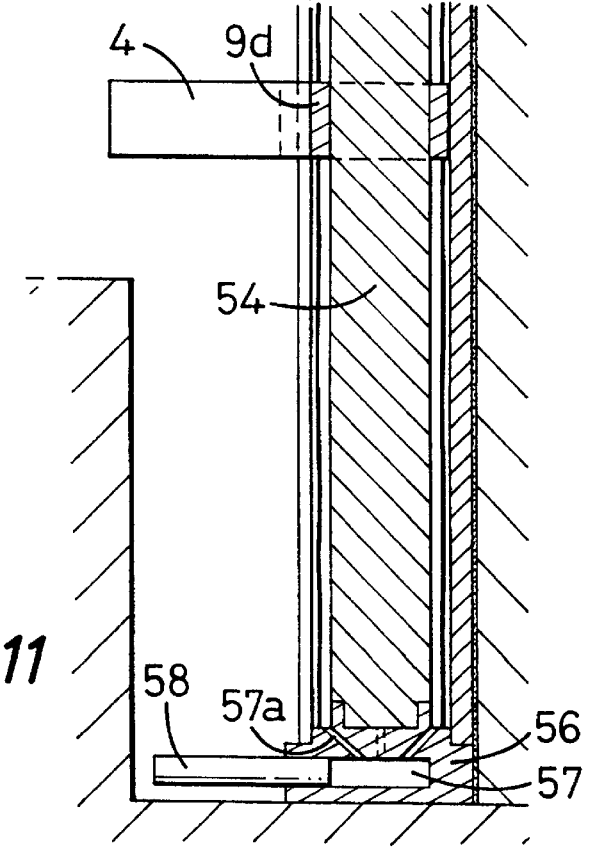

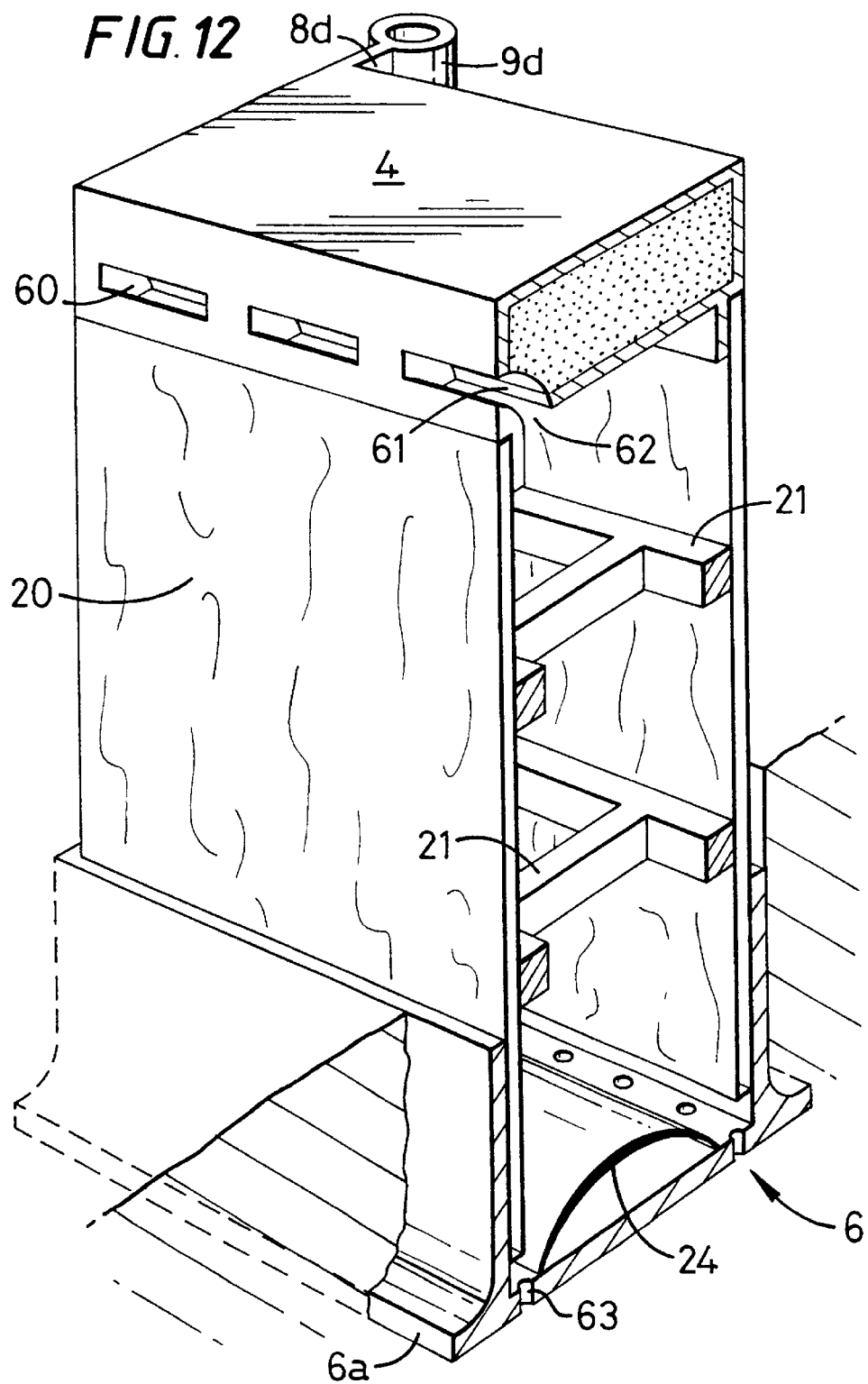

FLOOD PROTECTION DEVICE FOR CLOSING OPENING IN WALL AGAINST FLOODWATER

BACKGROUND OF THE INVENTION

1. Field of the Invention

The present invention relates to flood protection, and is particularly concerned with providing a device for preventing flood water from entering a building through a doorway or gateway.

2. Discussion of the Background

Not all of the damage done to a building by flooding is caused by the flood waters themselves, but by the deposition of sediments carried in the flood waters, and contamination by micro-organisms present in the flood waters. In areas susceptible to periodical flooding, such as buildings set close to rivers or near the sea, conventional measures adopted to attempt to prevent the ingress of flood waters or tidal surges include the placing of temporary barriers across the doorways of buildings, or the erection of permanent raised thresholds which extend above the expected level of the water. The most commonly used temporary barrier is a sandbag barrier, which must be placed in position before flood water rises over the threshold height.

While they are effective to keep out the flood waters for an initial period, sandbags soon become waterlogged and allow water to enter the building. The provision of permanent raised thresholds against flood waters is an inconvenience in the use of the building, as it restricts access to the building.

A further disadvantage of the temporary barriers commonly used against flood waters is that advance warning of the flood must be given to the occupant or attendant of the building, so that the barriers may be placed in position before the waters rise. Buildings which are unoccupied, or in which the occupants are asleep, are often inundated for want of the placement of such temporary barriers.

SUMMARY OF THE INVENTION

It is an objective of the present invention to provide a flood protection device which overcomes the disadvantages of the prior art, and allows unhindered access to the building while providing protection from the ingress of flood waters without the need for manual intervention.

A further objective of the present invention is to provide a barrier which can extend across the doorway of a building, and will deploy itself effectively at time of flood to prevent flood water from entering the building.

A further objective of the present invention is to provide an improved sealing means for such a flood protecting device, operable to form a water tight seal between the flood protection device and the wall of a building in which it is installed.

It is a yet further objective of the present invention to provide an active sealing means which employs the hydrostatic pressure of the flood water to effect a water tight seal between the flood protection device and the building.

According to the present invention, there is provided a flood protection device to close an opening in a wall against the passage of flood water through the opening, the device comprising a float which lifts a collapsible barrier out of a stored position below the opening to a deployed position wherein the barrier seals at least the lower part of the opening.

BRIEF DESCRIPTION OF THE DRAWINGS

Embodiments of the invention will now be described in detail with reference to the accompanying drawings in which:

FIG. 8 is a schematic front view of an alternative sealing element;

FIG. 9 is a sectional view in the plan IX—IX of FIG. 8;

FIG. 10 is a schematic cutaway perspective view of a seal element of the flood protection device;

FIG. 11 is a sectional view in the plane XI—XI of FIG. 10;

FIG. 12 is a cutaway perspective view of the flood protection device; and

DESCRIPTION OF THE PREFERRED EMBODIMENT

Figure 1:
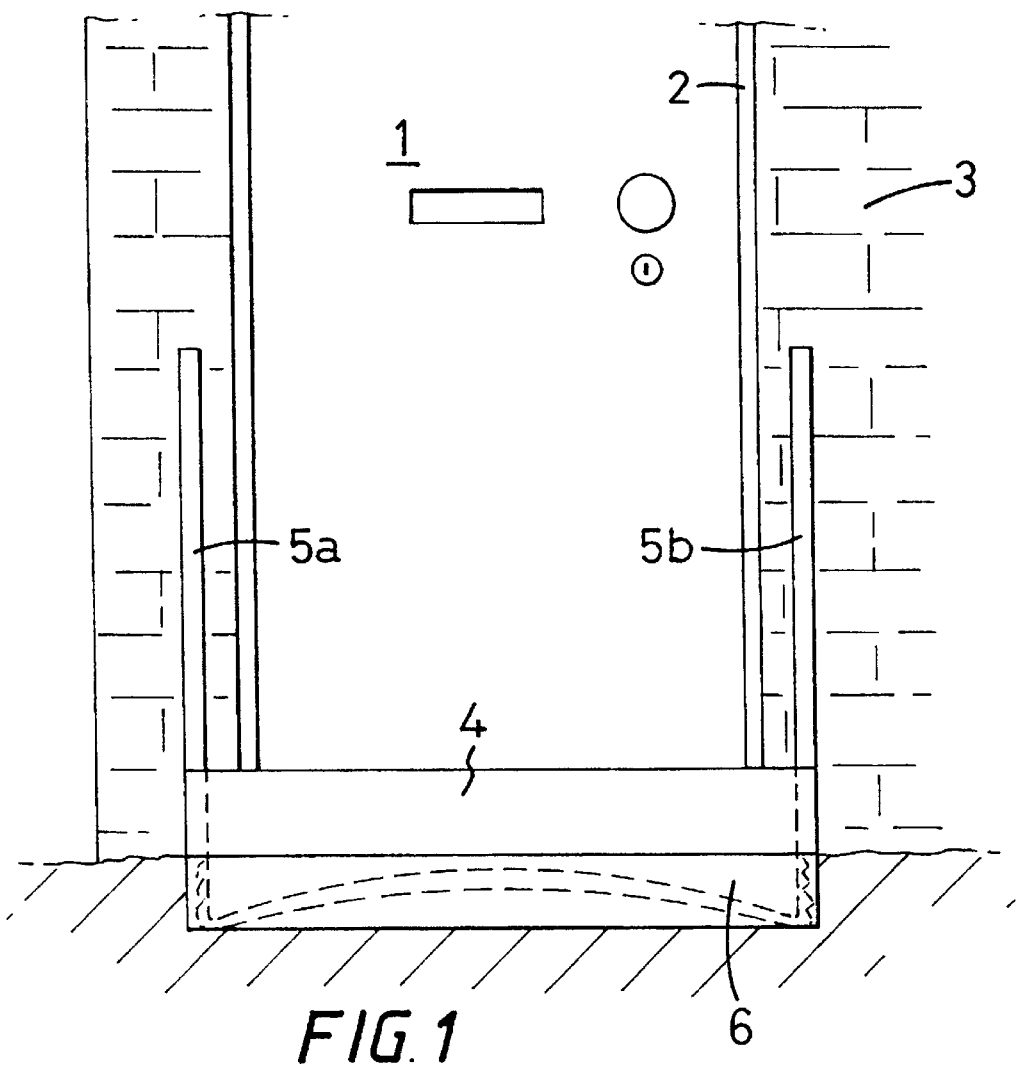
FIG. 1 shows a front elevation of the device installed in a dwelling.

Referring now to the drawings, FIG. 1 shows the flood protection device installed to protect a door 1 closing a doorway 2 in a wall 3 of a dwelling. The device may alternatively be installed below a window or other opening. In place of the conventional doorstep (or window sill, as the case may be) is a float 4, which is slideably retained at its ends in vertically extending guide elements 5a and 5b. Beneath the float 4 is a well 6, wherein is stored in a stowage position a collapsible barrier element, and optionally a fluid pressure generator 7, which will be described in detail later.

Figure 2:
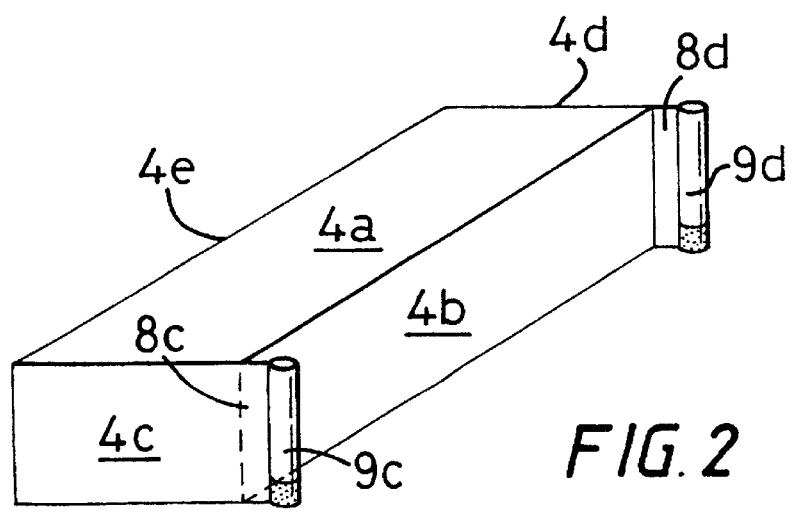
FIG. 2 is a perspective view of the float.
Figure 5:
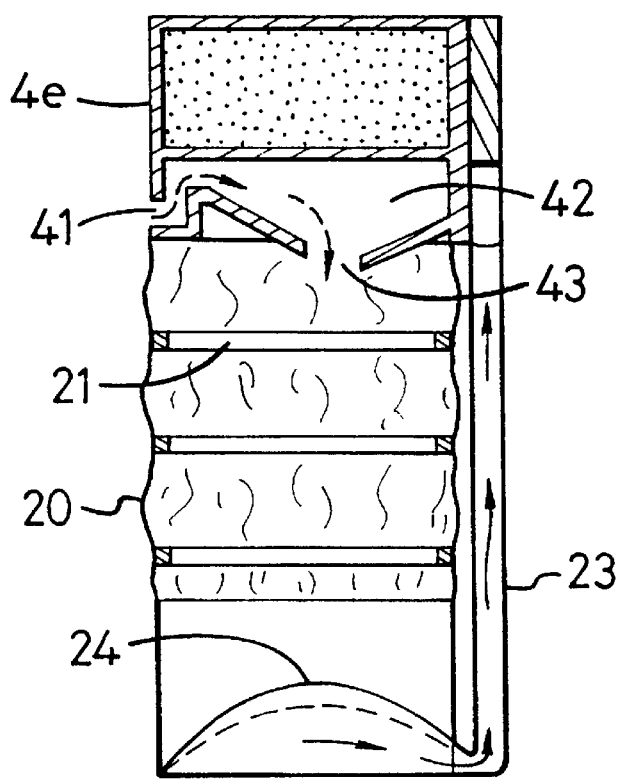
FIG. 5 is a vertical sectional view in the plane V—V of FIG. 4.

The float 4 is shown in perspective in FIG. 2, and in sectional view in FIG. 5. The float is generally parallelipipedal in form, having a top surface 4a, a rear surface 4b, end faces 4c and 4d and a front face 4e. Attached to the end faces 4c and 4d of the float, are respective webs 8c and 8d which extend beyond the rear face 4b of the float 4 and terminate in tubular sliders 9c and 9d respectively. The sliders 9c and 9d are spaced and dimensioned to co-operate with the guide elements 5a and 5b respectively, to permit the float 4 to perform guided vertical movements relative to the wall 3. The slides may be provided with lubricant reservoirs to dispense lubricant into the guide channels. As can be seen from FIG. 5, the float is formed on its front face 4e with an inlet opening 41 which leads to an inlet plenum 42 which has a downwardly open discharge opening 43.

Figure 3:
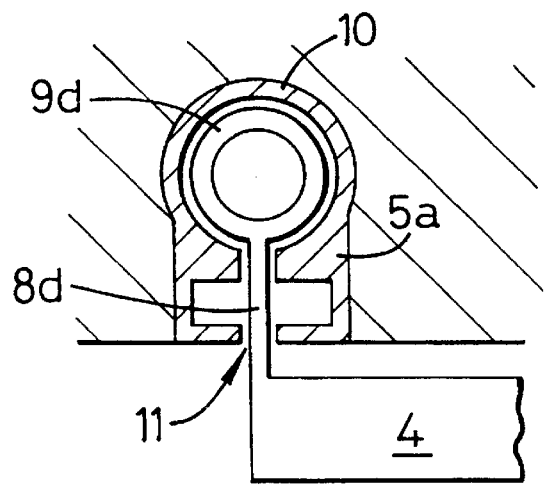
FIG. 3 is a horizontal sectional view of the guide rail and seal.

FIG. 3 shows a first embodiment of a guide rail 5a. The guide rail 5a is built in to the wall 3, but in alternative embodiments to be described below the guide rails 5a and 5b may be attached to the surface of the wall 3 by means of conventional fixings. In either case a mortar or mastic sealing compound may be used to provide a watertight joint between the wall 3 and the guide rails. The guide rail 5a of FIG. 3 comprises an elongate generally hollow element having a cylindrical bore 10 which is open at a slot 11 facing away from the wall. The transverse dimension of the slot 11 is less than the diameter of the bore 10, for reasons to be described later. A brush-type or other closure may be provided across the opening of the slot 11 to exclude dust and dirt, provided that it prevents little or no resistance to the raising and lowering of the float 4.

Figure 4:
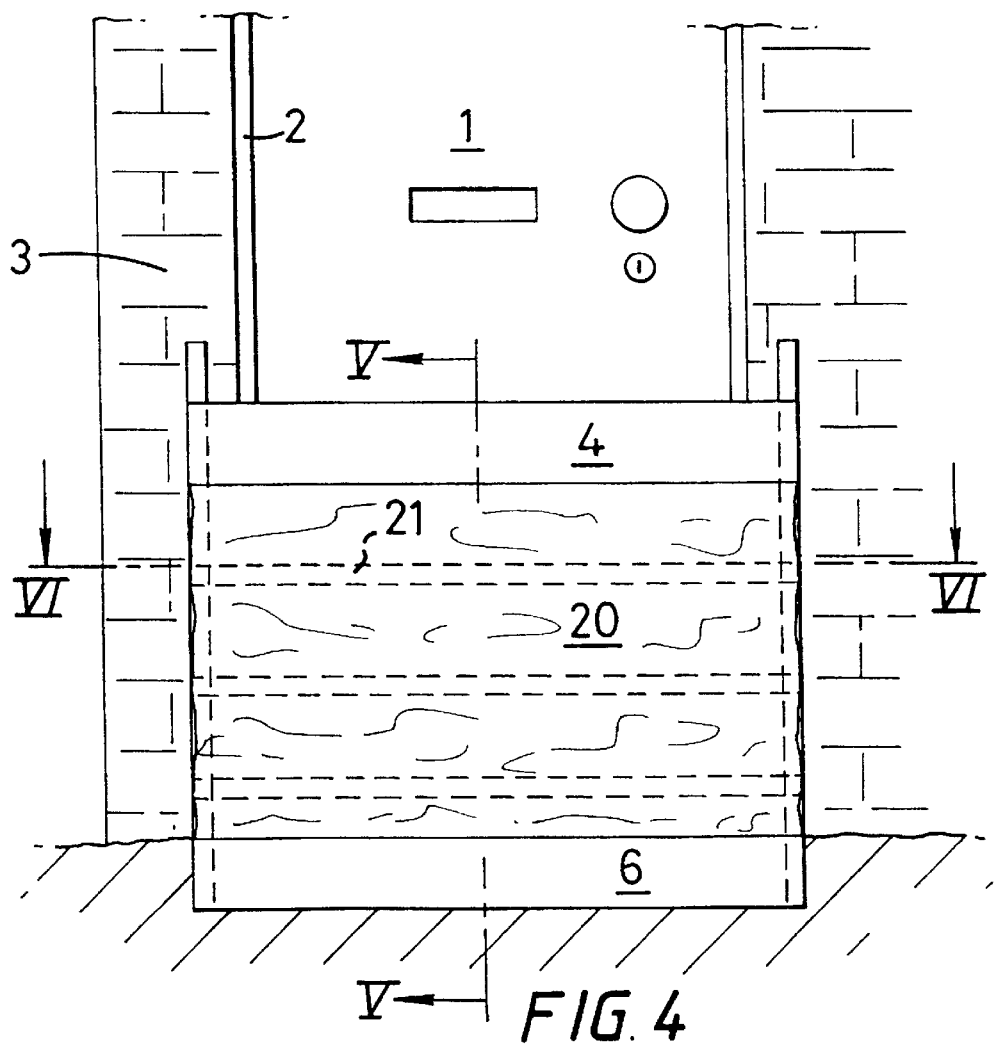
FIG. 4 is a view similar to FIG. 1, showing the device deployed.

FIG. 4 shows the flood protection device in its deployed position with the float 4 raised in relation to the doorway 2. The upper extremity of the barrier element 20 is attached to the underside of the float 4, while the lower extremity of the barrier element 20 is sealingly attached to the interior of the well 6. As the float 4 rises up the guide rails 5a and 5b, the barrier element 20 is drawn out of its stowage position within the chamber 6 and extended vertically to close off the lower part of the doorway 2.

The barrier element 20 may be a single sheet of flexible waterproof material, but in the embodiment shown the barrier element 20 comprises a generally rectangular section tube of flexible waterproof material extending downwardly from the float 4. Suitable sheet materials for the barrier include woven plastics sheets such as are used for tarpaulins and groundsheets, etc. or sheets of rubberized fabric. The sheet material must be waterproof and flexible, and must preferably exhibit little or no elasticity. The material is preferably light in weight and buoyant in water. The cross sectional shape of the tube corresponds to the shapes of the float 4 and the chamber 6, and frames 21 attached to the interior of the tube at intervals along its height preserve the shape of the tube. The frames 21 are preferably buoyant, as is the flexible material from which the barrier element 20 is formed. The front and side faces of the tubular barrier element 20 may be formed with openings to assist filling and emptying of the barrier as the level of flood water rises and falls. The barrier may have a self supporting portion which extends upwardly above the float and sealingly engages the guide rails 5a and 5b.

Along its edges, which are substantially vertical when deployed, the barrier element 20 is formed with flexible flanges 22 (see FIG. 7) which attach the barrier element 20 to respective inflatable sealing gaiters 23. The inflatable sealing gaiters are attached to the undersides of the respective sliders 9c and 9d of the float 4. In the preferred embodiments illustrated, further sealing gaiters extend from the upper surfaces of the sliders 9c and 9d to the upper ends of the respective guide elements 5a and 5b. The lumens of the upper and lower sealing gaiters attached to each respective slider are in fluid communication with each other, and the upper ends of the upper sealing gaiters are closed.

Within the well 6, the lower end of the barrier element 20 is sealingly attached to the walls of the well, and the flanges 22 are sealed at their lower ends between the barrier element 20 and their respective guide rails 5a, 5b to form a waterdight barrier. The interiors of the lower sealing gaiters may be in direct fluid communication with the interior of the well 6, but in the embodiment shown they are in fluid communication with a variable-volume space defined between a flexible membrane 24 and the base of the well 6.

In the inactive position of the device, the float 4 rests on the upper edge of the well 6 and serves as a doorstep in the embodiment described. The float 4 may be constructed from any suitable material such as wood or reinforced plastics. The float may be solid, or may be hollow and optionally filled with a buoyancy material such as a closed-cell foam, preferably of plastics material. Polyurethane foams such as are used in boat building may be suitable fillings for hollow floats.

With the float in this position the barrier element 20 and the frames 21 are accommodated within the well 6, the flexibility of the barrier element 20 enabling it to fold to the stowage position. The gaiters 23a extending from the undersides of the sliders 9c and 9d are collapsed in concertina fashion within the guide rails 5a and 5b. The gaiters extending upwardly from the sliders 9c and 9d are extended, to contain a volume of air substantially equivalent to the volume of the cylindrical bores 10 of the guide rails 5a and 5b. The membrane 24 is preferably spaced from the base of the well 6, and a volume of air or other fluid is contained in the space defined therebetween. The membrane 24 may be held away from the base of the well 6 by, for example, filling the space with a resilient open-cell foam, or by providing the membrane 24 with sufficient stiffness to support itself in such a position.

When the water level outside the building rises, water first enters the inlet opening 41 in the float 4, and progresses to the plenum 42 from whence it falls through the discharge opening 43 and through the stowed barrier element 20 to fill the well 6 above the membrane 24. The first effect of this ingress of water is to press down the membrane 24, squeezing the fluid held between the membrane 24 and the base of the well 6 into the interiors of the gaiters 23. This inflates the gaiters 23 and 23a within the guide rails 5a and 5b to ensure a watertight seal therebetween.

As the water level rises further the buoyancy of the float 4 causes it to lift, moving the sliders 9c and 9d upwardly in their respective guide rails. This lifting of the float 4 draws the barrier element 20 out of its stowage position in the well 6, as more water flows into the well 6 through the inlet, plenum and discharge opening of the float 4. The buoyancy of the frames 21 ensures that the material of the barrier element 20 is held taut at the lower end of the barrier element 20, while the upper portions of the barrier element remain folded. This minimizes frictional contact between the barrier element 20 and the closed door 1, optimizing the use of the upward force exerted by the float 4.

As the water level rises further, the head of water pressing on the membrane 24 increases, increasing the fluid pressure within the gaiters so as to provide an effective seal. The initial volume of the space between the membrane 24 and the base of the well 6 is arranged to be sufficient to provide enough fluid to the sealing gaiters 23 and 23a to inflate them to a sealing condition.

The total volume within the gaiters 23 and 23a both above and below the float is substantially constant, because as the gaiters 23 below the float are extended by the lifting of the float, so the gaiters 23a above the float are compressed between the float and the upper end of their respective guide element. A seal is therefore produced along the entire length of the guide element by the inflated gaiters at all times.

The membrane 24 serves as a fluid pressure generator to generate an increased pressure within the gaiters. As an alternative to the membrane 24, the lower ends of the gaiters may simply be left open to communicate with the interior of the well 6. With this construction, as water enters the well 6 and covers the entrances to the gaiters, further increase in the level of water outside causes water to enter the gaiters, compressing the air within them and inflating the gaiters to form effective seals.

Figure 7:
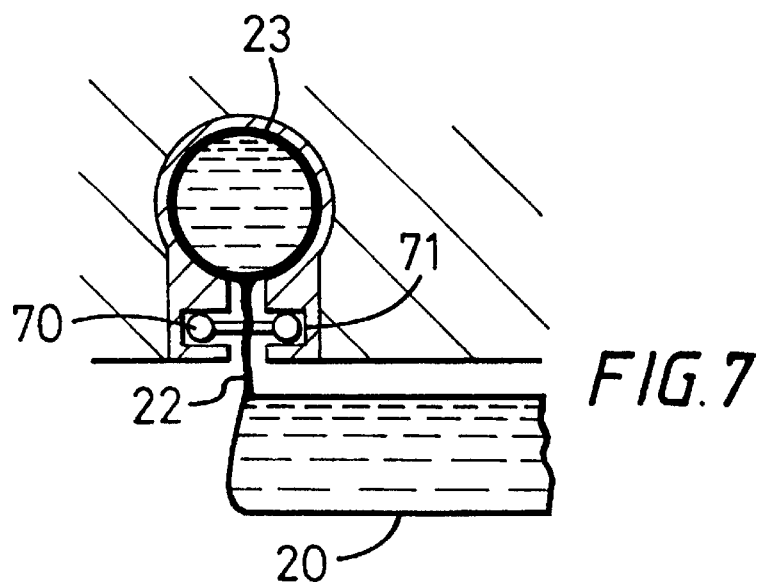
FIG. 7 is a sectional view of an alternative sealing element and guide rail.

FIG. 7 shows a horizontal sectional view similar to FIG. 3, through a guide rail 5b, in which sealing gaiter 23 is inflated to seal the bore 10 of the guide rail. The flange 22 connecting gaiter 23 to the barrier element 20 extends through slot 11, and in this embodiment is provided with stress-relief elements 70 which engage channels 71 in each side of the slot 11 to reduce tension on the gaiter 23 exerted by the flange 22. The stress-relief elements 70 are composed of a pair of beads, linked by a shaft which sealingly penetrates the flange 22. As an alternative stress-relief structure, a boltrope or other thickening may be incorporated in the flange 22 to cooperate with a widened section of the slot 11. The stress-relief structure should not impede the vertical sliding movement of the flange 22 in the slot 11.

FIGS. 8 and 9 show an alternative embodiment of the guide rails and seals. In the embodiment shown, each guide rail 5a, 5b comprises a tubular portion 50 with a slot 51 for the flange 22 of the barrier element. A fixing foot 52 extends along the guide rail opposite the slot 51, and enables guide rail to be fixed to the wall 3 by means of conventional fasteners 53. A sealant layer 52a may be provided between the foot 52 and the wall 3. Extending coaxially within the tube 50 is a guide rod 54. The purpose of the guide rod 54 is to engage the sliders 9c and 9d of the float 4 to promote smooth movement of the sliders within the guide rails, and also to occupy the interior volume of the sealing gaiters 23. This reduces the amount of fluid required to be injected into the gaiters to inflate them sufficiently for an effective seal to be formed. It is however foreseen that the guide rods 54 may be formed hollow to save on material cost, and may have their interior space in communication with the interior of the gaiter 23 and/or 23a via openings in the tube wall. Stress-relief structures similar to those discussed in relation to FIG. 7 may be incorporated in the guide rails in this embodiment.

FIG. 10 is a perspective view of the guide rail shown in FIG. 9, with the flange 22 cut away. FIG. 11 shows the guide rail of FIG. 10 in a vertical section. At the lower end of the guide rail in the Figures, a baseplate 56 is provided with an internal cavity 57 connected to an external spigot 58. Passageways 57a within the base 56 connect the cavity 57 with the interior of the gaiter 23. Cooperating formations on the base 56 and the lower end of the rod 54 locate the rod 54 centrally in the bore of the guide rail. At the upper end of the rod 54, an end cap 59 locates the rod 54 centrally in the bore of the guide rail, and provides an air tight seal for the upper end of the flexible gaiter 23a extending upwardly from the float 4. As has been described above, when fluid pressure is applied to the spigot 58 either by means of a fluid pressure generating device, or by the ingress of flood water into the spigot 58, the pressure is communicated to the interior of the gaiters 23 and 23a and expands them to fill the guide rail and effectively seal it.

FIG. 12 is a perspective view of another embodiment of the barrier element 20 and float 4, in the fully deployed position. In this embodiment, the float 4 is of hollow, foam-filled construction, and on its front face includes a number of inlet openings 60, connected by inlet passageways 61 to outlet openings 62 on the underside of the float. The barrier element 20 comprises a tube of flexible waterproof material extending downwardly from the edges of the float 4, to be secured to the interior surfaces of a well 6. Within the well 6 is a flexible membrane 24 sealed to the base of the well 6, to provide fluid pressure to the sealing gaiters. Drain holes 63 are provided through the base of the well to allow any liquid within the well 6 to seep away into the ground.

Figure 6:
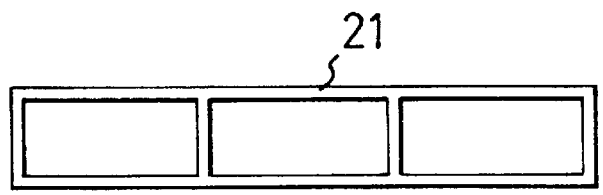
FIG. 6 is a plan view of a frame.

Within the barrier element 20 shown in FIG. 12 are two frames 21, shown in plan view in FIG. 6. These frames are fixed to the inner surfaces of the tubular barrier element 20, and are so dimensioned as to be able to be accommodated within the well 6 when the barrier element in its stowed position.

The well 6 is preferably formed by setting a box-like structure into a hole in the ground and securing by concreting around the box-like structure. outwardly extending ribs 6a coplanar with the base of the well 6 will thus be overlain by the material surrounding the box-like structure, and will retain it against lifting. The well 6 may be set far enough into the ground for the upper surface of the float 4 to be at ground level when inactive. Alternatively, the float may be situated above ground level in the inactive position to serve as a step for access to the doorway 2. In either case, the inlet openings in the float may be positioned so as to be substantially concealed when the device is inactive. This will assist in preventing blockage of the openings.

Figure 13:
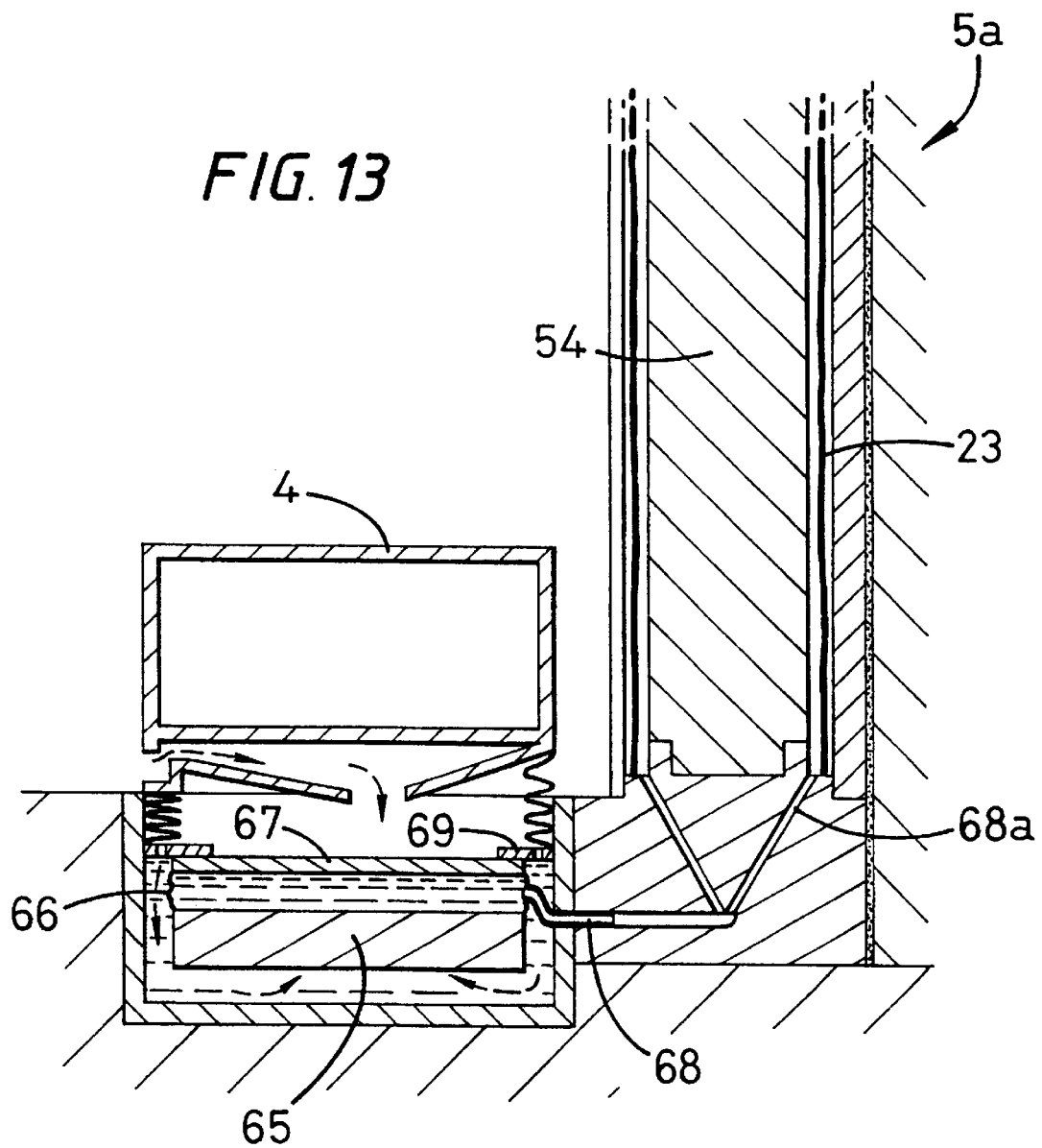
FIG. 13 is a schematic sectional view of a fluid pressure generator.

FIG. 13 shows, in schematic cross-section, a flood protection device similar to that shown in FIG. 5, but in this embodiment an alternative means for producing fluid pressure within the sealing gaiters is used.

In the embodiment of FIG. 13, the means for developing fluid pressure within the gaiters comprises a float 65, whose upper surface is attached by means of a flexible bellows 66 to a rigid top plate 67. A tube 68 communicates with the space defined between the float 65, the bellows 66 and the top plate 67. This space may be filled with a pressure-transmitting fluid such as a light oil or water, or may be filled with a gas such as air or an inert gas. Within the well 6, stop elements 69 are installed to limit upward movement of the top plate 67.

In this embodiment, as soon as any water enters the well 6, the float 65 tends to rise. Since the upward movement of the top plate 67 is limited by the stops 69, the fluid between the float 65 and the top plate 67 is compressed and urged via the tube 68 into the interior of the sealing gaiters mounted in the guide elements 5a and 5b, via the passageways 68a in the base 56 shown in FIG. 13. With this embodiment, even before flood water has reached a high level, the amount of pressure generated within the sealing gaiters is sufficient to form an effective seal. As the level of flood water rises above the level of the top plate 67, the fluid in the space between the float 65 and top place 67 is subjected to the hydrostatic pressure of the flood water, as well as the compressive effect of the float 65. Thus, a pressure which is higher than the hydrostatic pressure of the flood water is generated in the fluid within the sealing gaiters 23. It will be appreciated that in FIG. 13 the guide rail elements are shown to an enlarged scale in relation to remaining parts of the flood protection device for clarity. Further, as a matter of convenience, the bellows 66 may be a flexible membrane of the same material as the barrier element 20, and the fluid connection between the interior of the bellows 66 and the tube 68 may be made by means of a passageway formed through the float or through the top plate. Such a construction avoids the need for attaching a tube to a flexible membrane. If the fluid used in this fluid pressure generator is a liquid, it will be appreciated that additives may be mixed with the fluid, for example to prevent the fluid from freezing or to prevent the fluid from attacking the materials of the barrier. Valve means (not shown) may be provided, for example in the top plate 67, to enable fluid to be introduced into the pressure generator, and to enable the fluid to be topped-up or changed in the course of maintenance.

The float, tubular barrier and well have been described as being rectangular in plan view in the preceding description.

It is foreseen that these components may be for example trapezoidal, or have any other shape to span the opening. To minimize the effect of current flowing along the wall in the floodwater, deflector plates may be provided to extend out from the wall on either side of the doorway to divert current flow from impacting on the sides of the barrier element.

Although in the embodiments described in the sealing strips comprise upper and lower gaiters 23 and 23a, it is contemplated that the upper gaiters 23a may be omitted and sealing of the barrier to the guide channels be achieved using only sealing strips extending between the lower edge of the barrier element and the float. The internal pressure achievable within such sealing strips is expected to be less than that achievable if upper gaiters 23a are provided, but nevertheless sufficient to effect an adequate seal.

It is further contemplated that the inflatable sealing elements may be provided not at the side edges of the barrier element, but in association with the guide rails. The inflatable elements would in such arrangements extend along the length of the guide rails, and when inflated would either seal against the lateral edges of the barrier element or would urge a sealing lip or other sealing component into sealing engagement with the barrier element.

In further alternative embodiments (not shown) stiffening elements may be incorporated into the barrier element to prevent it from bulging into the doorway under the pressure of water. Such elements may be in the form of metallic or rigid plastics plates extending across the doorway and arranged to retract into the well beneath the float when inactive. Alternatively a stiffening element in the form of a roller shutter device may be mounted either on the float or in the well to deploy behind the barrier element as it rises.

As an alternative to a barrier element formed from flexible sheet material, the barrier element may be a collapsible structure of rigid elements sealingly joined together, such as an array of plates capable of being fan-folded in the storage position and substantially coplanar in the fully deployed state.

There is thus provided, a simple, robust flood protection device for an opening in a wall or a building, which will deploy automatically in the event of a flood and effectively seal the opening in the wall or the building against the ingress of flood water. It is envisaged that either the float 4 or the float 65 may be connected to a switching device in an alarm circuit, so that flood waters can be detected and an alarm given. Such an arrangement is however an optional feature.

I claim:

1. A flood protection device to close an opening in a wall against the passage of flood water through the opening, the device comprising:
   a pair of guides extending vertically on either side of the opening;
   a float extending between the guides;
   a barrier element forming at its lower edge a seal with the wall between the guides and below the level of the opening, and fixed to the float; and
   sealing means to form a seal between the guides and the lateral edges of the barrier element,
   wherein the sealing means effects a seal between the barrier and the guides when fluid pressure is applied to the sealing means, and
   wherein the fluid pressure is derived from the hydrostatic pressure of the floodwater.

2. A flood protection device to close an opening in a wall against the passage of flood water through the opening, the device comprising:
   a pair of guides extending vertically on either side of the opening;
   a float extending between the guides;
   a barrier element forming at its lower edge a seal with the wall between the guides and below the level of the opening, and fixed to the float; and
   sealing means to form a seal between the guides and the lateral edges of the barrier element,
   wherein the barrier element is formed with elongate inflatable tubular sealing strips extending along its lateral edges, the strips being closed at their upper ends and open at their lower ends.

3. A flood protection device according to claim 2, wherein the tubular sealing strips each comprise an upper and a lower portion, the lower portions extending from the float to the lower edge of the barrier element, and the upper portions extending from the float to the respective upper ends of the guides.

4. A flood protection device according to claim 2, further comprising:
   means for transmitting a fluid pressure to an interior of the sealing strips, said transmitting means comprising the open lower ends of the respective strips.

5. A flood protection device according to claim 2, wherein the interiors of the sealing strips are in fluid communication with a variable volume chamber disposed below the barrier element.

6. A flood protection device according to claim 5, wherein the variable volume chamber is defined at least in part by a flexible membrane.

7. A flood protection device according to claim 6, wherein the variable volume chamber is defined between a fixed wall, a flexible bellows, and a movable wall.

8. A flood protection device according to claim 7, wherein the movable wall forms a lower surface of the variable volume chamber, and is buoyant in water.

9. A flood protection device according to claim 2 wherein the guides each comprise an internal bore open at one side via a slot whose width is less than the width of the bore, and the sealing strips are positioned in respective bores and are attached to the barrier element via flanges extending through the slots.

10. A flood protection device according to claim 9, wherein a central guide rod extends longitudinally within the internal bore of the guide, and the sealing strip surrounds the guide rod.

11. A flood protection device according to claim 10, wherein the guide rod is hollow.

12. A flood protection device according to claim 11, wherein the lumen of each guide rod is in fluid communication with the interior of its respective sealing strip.

13. A flood protection device to close an opening in a wall against the passage of flood water through the opening, the device comprising:
   a pair of guides fixable to the wall to extend vertically on each side of the opening;

a float engageable with the guides for vertical movement relative thereto;

a barrier element fixed to the float and capable of forming a seal with the wall between the guides and below the opening; and sealing means operable between the guides and the lateral edges of the barrier element, wherein the barrier element is a tubular structure attached at one end to the float and at the other end to the interior of an upwardly open well situated below the opening in the wall.

14. A flood protection device according to claim 13, wherein the barrier element is provided with one or more internal frames to preserve the cross-section of the tubular element.

15. A flood protection device according to claim 14, wherein the frames are buoyant in water.

16. A flood protection device to close an opening in a wall against the passage of flood water through the opening, the device comprising:

a pair of guides fixable to the wall to extend vertically on each side of the opening;

a float engageable with the guides for vertical movement relative thereto;

a barrier element fixed to the float and capable of forming a seal with the wall between the guides and below the opening; and sealing means operable between the guides and the lateral edges of the barrier element, wherein the sealing means are attached to the edges of the barrier element by means of flanges, and wherein the guides and the flanges are formed with cooperating stress relief formations.

17. A flood protection device according to claim 16 wherein the guides each have a slot through which the respective flange extends, and the sides of the slot are formed with grooves into which stress-relief elements attached to the flange extend.

* * * * *